March 30, 1926.

W. C. STEFFAN ET AL

SAW BLADE

Filed Dec. 29, 1924

1,579,039

Frank B. Ackermann,
W. C. Steffan,
Walter J. Greiner, INVENTOR

WITNESS:

Patented Mar. 30, 1926.

1,579,039

UNITED STATES PATENT OFFICE.

WILLIAM C. STEFFAN, FRANK B. ACKERMANN, AND WALTER J. GREINER, OF CHICAGO, ILLINOIS.

SAW BLADE.

Application filed December 29, 1924. Serial No. 758,736.

*To all whom it may concern:*

Be it known that we, WILLIAM C. STEFFAN, FRANK B. ACKERMANN, and WALTER J. GREINER, all citizens of the United States, residing at 4532 Palmer Street, Chicago, in the county of Cook and State of Illinois, have invented new and useful Improvements in Saw Blades, of which the following is a specification.

This invention relates to a novel construction of saw blade and has for its primary object the shaping of the ends of the blade so that the same may be more rigidly and accurately secured to a saw frame.

An object of the invention is the shaping of the ends of the blade to provide a connection between the blade and frame in such a manner that the ends of the blades will be reinforced.

Besides the above our invention is distinguished in shaping the ends of the blade into a plurality of flanges having a snug fit with the slots of the frame and so cooperating with the walls of the slot that excessive strain will not mutilate the connection.

With these and other objects in view the invention will be better understood from the following description taken in connection with the accompanying drawings, wherein.

Figure 1:
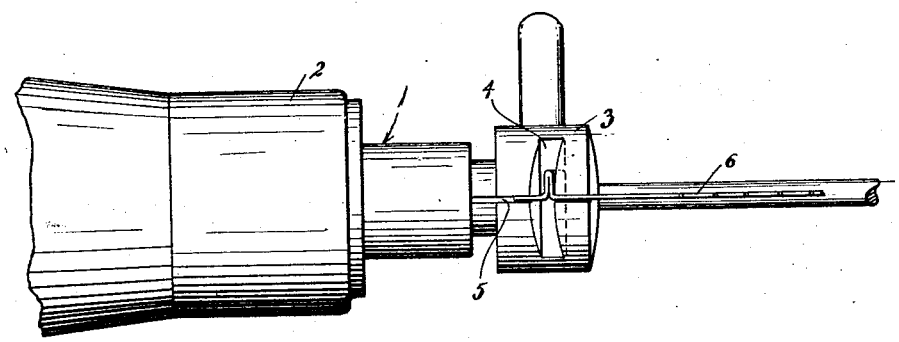
Fig. 1 is a fragmentary view of the frame showing one end of the blade attached thereto.
Figure 2:
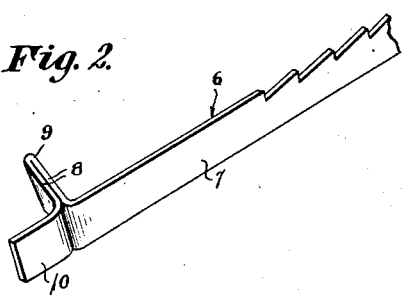
Fig. 2 is a perspective view of one end of the blade.

Again referring to the drawing illustrating one of the many constructions of my invention the numeral 1 designates an ordinary well-known commercial type of saw frame including the handle 2 and the clamp 3 having the undercut recess 4 and a slot 5 intersecting the recess. Our improved blade 6 comprises the body portion 7 with each end portion looped or bent to form parallel limbs 8 that provide the flange 9. A tongue 10 is formed at the continuation of the flange and is arranged in alignment with the body 7. The flange 9 is arranged at an incline to snugly fit in the undercut recess 4. A portion of the body is arranged in the slot 5 while the tongue 10 also engages in the slot 5. Thus the connection is such that a rigid effective grip is accomplished and any strain to which the flange 8 is subject is reinforced by the novel arrangement of the tongue 10 in the slot.

Figure 3:
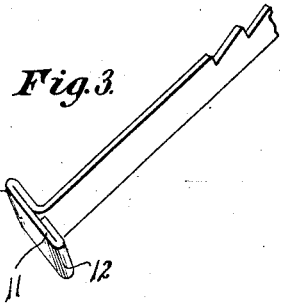
Fig. 3 is a perspective view of another construction of blade.
Figure 4:
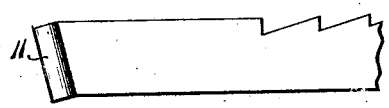
Fig. 4 is a side elevation of that construction shown in Fig. 3.

In Figures 3 and 4 we have shown the end portion of the saw bent to provide two sets of parallel limbs 11 to provide two flanges 12 that are arranged in the recess 4.

There are various ways of shaping and arranging the flanges to provide the connection and therefore we do not desire to be limited to the exact shape and construction illustrated as the main feature of our invention is to associate the ends of the blades as to reinforce the same and besides provide an effective grip between the blade and the frame.

Having thus described our invention, what we claim is:

1. In combination with a frame having an undercut recess and a slot intersecting the recess, a blade having one end formed into a flange for insertion in the recess and a tongue inserted in the slot to reinforce said flange.

2. A saw blade having its end portion bent back upon itself to form parallel limbs for providing a flange, and a tongue extending at an angle to the flange and in alignment with the body of the blade to reinforce said flange in the use of the blade 3. In combination with a saw frame including a clamping member having an undercut recess and a slot intersecting the same, a blade having its end portion formed to provide a laterally projecting flange, said flange being disposed in parallelism with the contacting undercut wall of the recess.

4. In combination with a saw frame including a clamping member having an undercut recess and a slot intersecting the same, a blade having its end portion formed to provide a laterally projecting flange and a tongue extending therefrom, said flange being disposed in parallelism with the contacting undercut wall of the recess and the tongue fitting into the slot beyond the flange to reinforce the latter.

5. As a new article of manufacture, a saw blade having its end portion formed to provide a laterally projecting flange disposed at an inclination inwardly of the blade from the front to the back thereof.

6. As a new article of manufacture, a saw blade having its end portion formed to provide a laterally projecting flange disposed at an inclination inwardly of the blade from the front to the back thereof, the blade being extended beyond the flange and forming a tongue for reinforcing the flange when the blade is secured in a saw frame.

In testimony whereof, we affix our signatures.

WILLIAM C. STEFFAN.
FRANK B. ACKERMANN.
WALTER J. GREINER.